United States Patent
Anderle

(10) Patent No.: US 7,394,574 B2
(45) Date of Patent: Jul. 1, 2008

(54) METHOD AND DEVICE FOR ELECTRONICALLY CORRECTING THE COLOR VALUE IN FILM SCANNERS

(75) Inventor: Klaus Anderle, Darmstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 1030 days.

(21) Appl. No.: 10/477,804

(22) PCT Filed: Apr. 22, 2002

(86) PCT No.: PCT/EP02/04383

§ 371 (c)(1),
(2), (4) Date: Nov. 14, 2003

(87) PCT Pub. No.: WO02/093940

PCT Pub. Date: Nov. 21, 2002

(65) Prior Publication Data

US 2004/0130735 A1    Jul. 8, 2004

(30) Foreign Application Priority Data

May 16, 2001    (DE) ................. 101 23 787

(51) Int. Cl.
*G06K 15/00* (2006.01)
*G06K 9/00* (2006.01)
*G06K 9/48* (2006.01)

(52) U.S. Cl. ............. 358/3.28; 358/2.1; 382/198; 382/165

(58) Field of Classification Search ............. 358/468, 358/444, 448, 471, 474, 500, 501, 518, 530, 358/506, 519, 522, 2.1, 3.28; 382/164, 190, 382/198, 165

See application file for complete search history.

(56) References Cited

U.S. PATENT DOCUMENTS

| | | | |
|---|---|---|---|
| 4,418,358 A | | 11/1983 | Poetsch et al. ............... 358/80 |
| 5,113,251 A | * | 5/1992 | Ichiyanagi et al. .......... 358/500 |
| 5,172,419 A | * | 12/1992 | Manian ..................... 382/132 |
| 5,469,209 A | * | 11/1995 | Gunday et al. ................ 348/96 |
| 6,192,193 B1 | * | 2/2001 | Smart et al. .................... 396/6 |
| 7,053,927 B2 | * | 5/2006 | Jones et al. ................... 348/97 |
| 2003/0081118 A1 | * | 5/2003 | Cirulli et al. ................. 348/104 |
| 2003/0211408 A1 | * | 11/2003 | Szajewski et al. ............. 430/21 |
| 2003/0234944 A1 | * | 12/2003 | Gindele ..................... 358/1.9 |
| 2004/0042025 A1 | * | 3/2004 | Takano et al. ................ 358/1.9 |
| 2006/0057509 A1 | * | 3/2006 | Kondo et al. ................ 430/567 |

FOREIGN PATENT DOCUMENTS

WO    98/07281    2/1998

* cited by examiner

*Primary Examiner*—Jerome Grant, II
(74) *Attorney, Agent, or Firm*—Joseph J. Laks; Robert B. Levy

(57) ABSTRACT

A method for digitizing images stored on film material has, after the image conversion by means of a digitizing device firstly an electronic color value correction independent of user inputs. A user-controllable correction and manipulation of the electronically stored information is subsequently carried out only after the electronic color value correction, which is effected in a manner dependent on properties of the digitizing device and on film material properties. The electronic color value correction depends on parameters which can be adapted to varying properties of the digitizing device. A film scanner adapted to this method has a digitizing device and also a device for controllable correction of the converted image data. A device of discrete construction for electronic color value correction is connected between the digitizing device and the device for controllable correction. An interface for reading in and reading out electronically stored correction data is connected to the device for electronic color value correction.

6 Claims, 1 Drawing Sheet

METHOD AND DEVICE FOR ELECTRONICALLY CORRECTING THE COLOR VALUE IN FILM SCANNERS

Figure 1:
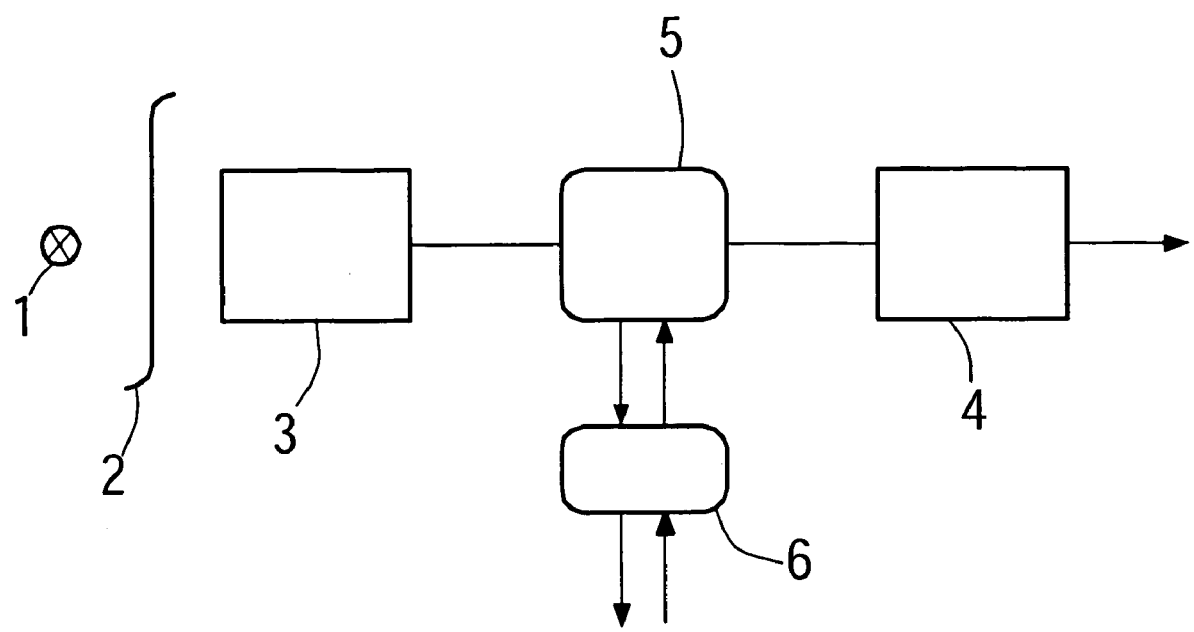

This application claims the benefit under 35 U.S.C. § 365 of International Application PCT/EP02/04383 filed Apr. 22, 2002, which claims the benefit of German Application No. 10123787.1 filed May 16, 2001

FIELD OF THE INVENTION

The invention relates to a method for digitizing images stored on film material, an image being converted into electronically stored information by means of a digitizing device and a user-controllable correction of the electronically stored information subsequently being effected, it also being possible to carry out an electronic color value correction.

BACKGROUND OF THE INVENTION

The continuously increasing computing power and storage capacity of electronic data processing systems enables not only individual images but whole films to be digitized in virtually completely automated fashion.

It is thus possible in the meantime for image and film documents stored on film material to a large extent to be digitally conditioned and stored. Depending on the quality and storage conditions of the exposed film material, chemical processes may attack or even destroy the film material. By contrast, the digital image information can be stored and duplicated virtually without any losses over long periods of time.

Computer-aided or wholly computer-generated alterations of the image information are being carried out to an increasing extent in film productions for television and cinema. In complex cinema productions, whole film sequences or even the entire film are processed subsequently. The alterations that are possible in this case range from slightly corrective color or brightness changes through to the addition of new or deletion of undesired image parts.

Recording techniques which enable the background or individual image parts to be masked out in a simple manner have been developed. Thus, by way of example, the actors act in front of a homogeneously blue background, the "blue box", during film recordings. In the course of electronic image processing, the blue background can then be replaced by an arbitrary other, possibly wholly computer-generated background.

Principally complex image manipulations of relatively long film sequences require a high outlay on computing power and storage capacity and also processing time. In the case of film productions that are to be post-processed in complex fashion, significantly more time and labor and resultant costs then have to be used for the post-processing of the digitized images than for the actual film recordings. There are only a small number of companies which specialize in this and are suitable due to their size and technical equipment for the electronic post-processing of an extensive film project.

The film recordings are digitized by film scanners. For this purpose, each individual image of a film is projected onto a light-sensitive electronic image converter, usually a CCD camera, by an imaging unit. The projection of the individual image is then scanned by CCDs arranged in point, line or matrix form and is converted into electronic image information. In this case, each measured pixel is uniquely described by coordinates in a color system, usually the YcrCb system. The number of pixels that can be measured electronically per individual image and also the accuracy with which the coordinates in the color system are defined substantially determine the quality of the digitized image information. The technical possibilities permit high-resolution digitizing of a film at a speed which corresponds approximately to the playback of the film.

The digitized image information can be uniformly corrected and manipulated for in each case individual images or a whole image sequence. Correction of the electronic image data is regularly necessary on account of the manufacturing tolerances of the optical and electronic components of the film scanner. Depending on the film material used, the digitized image information prior to correction would have significant differences in hue and saturation since the often broadband color sensitivity of the film material usually deviates from the color sensitivities—defined by filter systems—of the digitizing device of the film scanner. These in part clearly perceptible differences have to be corrected in the context of subsequent image processing. These corrections are important in particular if digitized image sequences are to be combined with one another on different film scanners with different color sensitivities.

Special film sequences that are standardized with a high outlay are used for determining the apparatus-specific correction data. In this case, the individual images have known, precisely defined color and brightness values, so that the best possible correction of the measured digitized image information can be determined.

The purpose of digitizing image sequences is always, except perhaps for archiving purposes, to effect more or less clearly visible image manipulation. The image data present electronically can be altered as desired in this case. The retouching of individual image areas or the manipulation of the entire image content also corresponds essentially only to changing the brightness and color value of a corresponding number of pixels. The correction and also the deliberate image manipulation is accordingly effected by the controlled changing of the pixel information, which usually comprises complex calculations requiring a high outlay, however.

The high resolution and digitizing speed requires a correspondingly powerful hardware which can calculate, manipulate and store the large data streams obtained in real time. Therefore, not just for cost reasons, individual corrections and the deliberate image manipulation dependent on user inputs are combined both in the calculation algorithms and by the circuitry arrangement of individual electronic assemblies. Therefore, a single albeit complex calculation is carried out for each pixel, which calculation is used to carry out both the film-scanner-specific corrections and the diverse user-dependent image manipulations. Algorithms such as matrix correction or 6-sector color correction have proved to be advantageous in this case.

A complete separation of the correction calculation from the image manipulation dependent on user inputs is possible only with difficulty at the present time without the additional implementation of computation steps near to the hardware. This is due to the position of the different color correction elements with respect to one another and the thus incommensurately high computation complexity for a mutually independent correction of the film scanner properties and the user-dependent image manipulation. Thus, the calculations to be carried out for each pixel are in part so complex that calculation steps are replaced by references to values calculated in advance. In the case of computation methods of this type, it is no longer possible to calculate back to individual starting parameters owing to the nonfunctional relationship. Accordingly, the correction with regard to properties of the film scanner is always also effected in a manner dependent on the user inputs prescribed for the later image manipulation. Correction calculations given otherwise identical user stipulations also lead to deviating end results of the digitized and corrected image sequences owing to varying physical properties of the digitizing device of different film scanners. A film sequence shown contiguously therefore always has to be digitized on the same film scanner in order to enable identical results of the digitized image information.

It is precisely in the case of relatively large projects, in which splitting between a plurality of film scanners or even a plurality of production sites would be practical, that the restriction to a single film scanner leads at least to unnecessarily long project execution times and cost risks. Any apparatus defect then inevitably leads to long delays and in the worst case necessitates complete reprocessing of the film material.

SUMMARY OF THE INVENTION

Accordingly, it is an object of the invention to enable an independent correction of the digitized image information with regard to the apparatus-specific properties of the film scanner respectively used. An adaptation of the correction parameters to different film materials should likewise be able to be carried out independently of user specifications.

This object is achieved according to the invention by virtue of the fact that an electronic color value correction independent of user inputs is carried out after the image conversion by means of a digitizing device and before the user-controllable correction.

The subsequent processing of the digitized image information is thereby subdivided into two method steps that proceed separately from one another. In this case, the electronic color value correction carried out first is completely independent of user inputs, so that the latter have no influence on the correction calculations carried out directly after the electronic image conversion. Unambiguous separation into user-independent and user-dependent method steps is thereby possible.

It is preferably provided that the electronic color value correction is effected in a manner dependent on properties of the digitizing device and on film material properties.

Unavoidable deviations of individual optical or electronic components are a significant cause of varying measurement results in different film scanners. Production-dictated tolerances of the optical components and of the electronic digitizing unit have the effect, for example, of reducing the resolution of the film scanner within specific regions of the color space. The electronic color value correction carried out directly after the digitization takes account of such determinable properties of the film scanner. The correction calculation can be calibrated by evaluation of individual images with precisely defined color value information. This calibration can be carried out in each case with the desired film material, with the result that individual adaptation even to different film material properties is possible. Since the electronic color value correction carried out first depends only on the film scanner and the film material used, the same image sequence, in the event of digitization on different film scanners calibrated in this way, leads to digitized image information that is identical to the greatest possible extent. The electronic conditioning of film sequences can therefore be distributed as desired between different film scanners or even different work sites.

According to one refinement of the concept of the invention, it is provided that the electronic color value correction depends on parameters which can be adapted to varying properties of the digitizing device.

Properties that vary with time, for example of the light source used or of individual optical components, can appreciably alter the properties of the film scanner. The individual components of the film scanner are deliberately optimized for a best possible temporal stability. Thus, by way of example, the light source used to illuminate the individual images must have a constant light emission over the longest possible periods of time in order to avoid brightness and color changes brought about thereby within a progressively recorded image sequence. Unavoidable alterations in the properties of the film scanner nevertheless occur. These alterations can be minimized, for example by regular maintenance of the film scanner, but not completely prevented. The resulting deviations of the digitized image information can be acquired, however, and taken into account in the context of the electronic color value correction. In this way, a film scanner digitizing property that remains constant over a long period of time can be ensured by means of regular recalibration of the film scanner.

It is provided that the user inputs for correction of the electronically stored image information can be acquired and stored as a set of parameters and the parameters can be read in and out via an interface.

The knowledge of these parameters can be used to simplify the maintenance of the film scanners by means of additional information. It is also possible, by altering these parameters in a targeted manner, to optimally adapt the correction of the digitized image information to varying properties of the film material used. It is thus conceivable to use individual correction parameters to take account directly of specific properties of the film material such as, for example, the color sensitivity of the film material used.

The invention also relates to an apparatus for carrying out the method according to the invention having a digitizing device and a controllable device for correcting the electronically stored information, wherein the apparatus has a device of discrete construction for electronic color value correction and the device for electronic color value correction is connected between the digitizing device and the device for controllable correction of the electronically stored information.

In the method according to the invention, the electronic image processing was subdivided into two method steps carried out independently of one another. The calculations respectively required would therefore have to be processed one after the other. For this purpose, the electronic assemblies used would have to enable all conceivable image manipulations and could not be adapted to respective specific requirements. By contrast, a device of discrete construction for electronic color value correction can be optimized for this task.

It is advantageously provided that the device for electronic color value correction has an interface for reading in and reading out electronically stored correction data.

In this way, it is possible to carry out the maintenance and calibration of the film scanner completely independently of control devices and settings selected by the user.

According to one refinement of the concept of the invention, it is provided that the apparatus has an interface for reading in and reading out electronically stored correction data. In addition to the apparatus-specific or film-material-dependent correction parameters, the image processing parameters respectively selected by the user can also be interchanged via a generally utilizable interface. The film scanner currently being used can thus be changed at any point in time whilst maintaining all the parameters relevant to the image processing. Given knowledge of all relevant parameters, even complex processing operations can be documented and repeated reproducibly.

An exemplary embodiment of the invention is explained in more detail below in the drawing.

DETAILED DESCRIPTION

The film scanner illustrated in the drawing has a light source 1, past which the film material 2 is moved. The imaging of an individual image of the film 2 which is projected by the light source 1 is converted into electronic image information by a digitizing device 3. The digitizing device 3 usually comprises a combination of optical lenses and filters and also a CCD chip arranged in line form or matrix form.

The image information present in electronic form after the image conversion can be manipulated as desired by means of a device for controllable correction 4 before the image data are stored on suitable storage media. The device for controllable correction 4 of the digitized image information usually comprises a large number of interconnected processors and memory modules.

A device for electronic color value correction 5 is connected between the digitizing device 3 and the device for controllable correction 4. The device for electronic color value correction 5 is of completely discrete construction and independent of the device for controllable correction 4, which can be influenced by the user. The correction calculations carried out in the device for electronic color value correction 5 are dependent only on properties of the digitizing device 3 and of the film material 2 used. Only after the electronic color value correction has been carried out are the image data altered and manipulated by means of the device for controllable correction 4 in a manner dependent on user stipulations.

The device for electronic color value correction 5 has an interface 6 for reading in and reading out the correction data; said interface 6 may comprise for example a floppy disk or CD drive which can be operated with the aid of a screen and a keyboard.

What is claimed is:

1. A method for digitizing images stored on film material by means of a digitizing device, which converts the images into digital information, the digital information being stored electronically, after which a user-controlled correction of the electronically stored information is effected, in the course of which, if appropriate, a user-controlled electronic color value correction is also carried out, wherein, after the image conversion, the digitized image information is processed in two separate steps, wherein in a first step, a user-independent electronic color value correction is carried out, which is effected in a manner dependent on properties of the digitizing device, and in a second step, the user-controlled correction is carried out.

2. The method as claimed in claim 1, wherein the user-independent electronic color value correction is effected in a manner dependent on properties of the film material.

3. The method as claimed in claim 2, wherein the user-independent electronic color value correction depends on parameters which can be adapted to varying properties of the digitizing device.

4. The method as claimed in claim 1, wherein the parameters for the user-independent electronic color value correction of the electronically stored information are read in and/or read out as a set of parameters via an interface.

5. An apparatus for carrying out the method as claimed in claim 1 having a digitizing device and having a user-controlled device for correcting the electronically stored information, wherein the apparatus has a device for user-independent electronic color value correction which is connected between the digitizing device and the device for user-controlled correction of the electronically stored information.

6. The apparatus as claimed in claim 5, wherein the device for user-independent electronic color value correction has an interface for reading in and/or reading out electronically stored correction data.

* * * * *